Feb. 4, 1964 W. R. MELLO 3,120,157
FLUID PRESSURE DRIVE SYSTEM
Filed April 24, 1961 3 Sheets-Sheet 1

INVENTOR.
WILLIAM R. MELLO
BY
*Williams, David, Hoffmann & Yount*
ATTORNEYS

INVENTOR.
WILLIAM R. MELLO

INVENTOR.
WILLIAM R. MELLO
BY
Williams, David, Hoffmann & Jount
ATTORNEYS 3,120,157
FLUID PRESSURE DRIVE SYSTEM
William R. Mello, Euclid, Ohio, assignor to The Warner & Swasey Company, Cleveland, Ohio, a corporation of Ohio
Filed Apr. 24, 1961, Ser. No. 105,113
11 Claims. (Cl. 91—408)

The present invention relates to a fluid pressure drive system including a fluid pressure actuator for effecting movement of a slide member, particularly a slide member of a machine tool, at different rates of speed.

An important object of the present invention is to provide a new and improved fluid pressure system including a piston-cylinder fluid pressure actuator for effecting movement of a movable member at different rates with the movable element of the actuator effecting a change of speed at a predetermined position of the element.

Another object of the present invention is to provide a new and improved fluid pressure system as of the preceding object wherein the axial position of the movable element of the actuator at which the speed change occurs is variable by relatively rotating the piston and cylinder elements of the actuator.

Still another object of the present invention is to provide a new and improved simplified fluid pressure system including a piston-cylinder actuator for operating a slide member of a machine tool at one rate of speed as it approaches a predetermined position and then at a second rate of speed as it moves through the predetermined position, with the predetermined position at which the speed change occurs being changeable.

Further objects and advantages of the present invention will be apparent from the following detailed description of the preferred embodiment thereof made with reference to the accompanying drawings forming a part of the present specification and in which.

Figure 1:
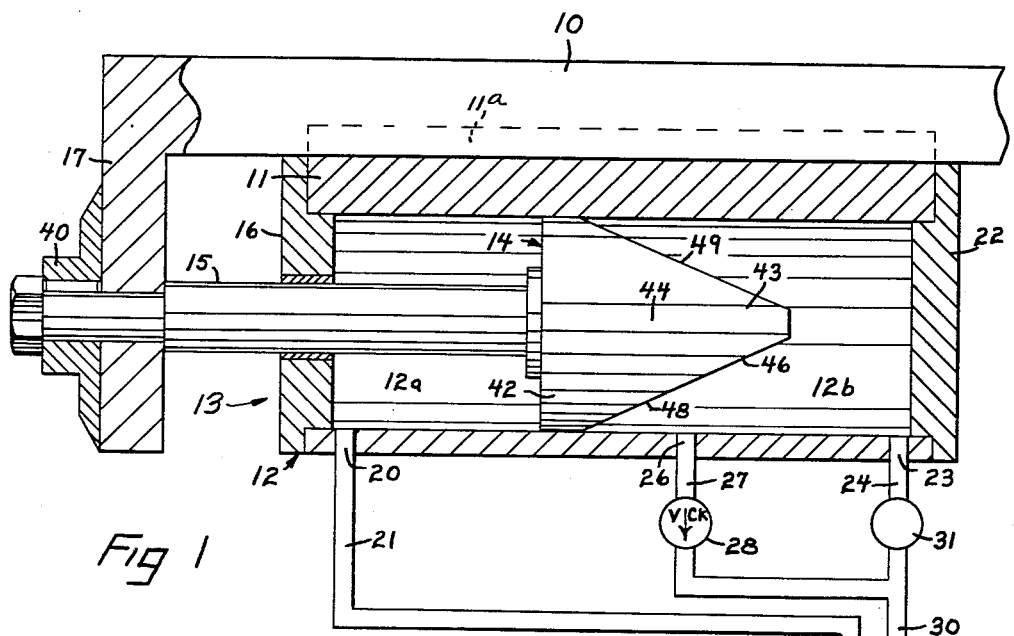
FIG. 1 is a sectional view with parts in elevation showing a slide and a fluid pressure actuator for operating the slide and including a diagrammatic showing of the fluid pressure system including th actuator.
Figure 2:
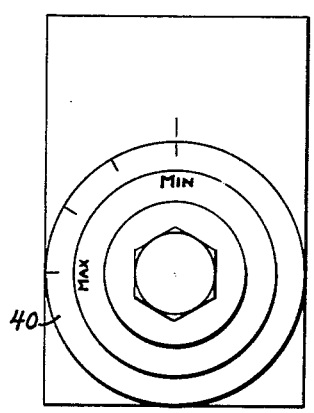
FIG. 2 is a view looking at the left-hand side of the structure of FIG. 1.

While the present invention is susceptible of various constructions and modifications and of use where it is desirable to change the speed of an element being moved by a piston-cylinder actuator, it is particularly useful when embodied in a fluid pressure drive for actuating a slide of a machine tool to change the rate of the movement of the slide from a rapid traverse rate to a slower rate and such a system is herein shown and described.

Referring to the drawings, a slide member 10 is supported for sliding movement on a support member 11, which may be the bed or a carriage of a machine tool. The support member 11 is provided with a way 11a which guides the slide 10 in its movement and is formed with a cylinder 12 that extends parallel to the way 11a below the latter. The cylinder 12 constitutes the cylinder element of a piston-cylinder actuator 13 having a piston 14 which is received in the cylinder element 12 and a piston rod 15 which extends through an end wall 16, closing one end of the cylinder element 12, the left-hand end as viewed in FIG. 1, to extend outwardly of the end wall 16 and of the member 11. The outer end of the piston rod 15 is connected to an apron 17 depending from the left-hand end of the slide member 10, as the latter is viewed in FIG. 1, so that reciprocation of the piston 14 within the cylinder element 12 will effect a reciprocation of the slide 10. The cylinder element 12 has a port 20 which opens into the cylinder adjacent the end wall 16 on the left-hand side of the piston 14, as the latter is viewed in FIG. 1, and which is connected to a conduit 21 which may function as a conduit for connecting the chamber 12a of the cylinder element on the left-hand side of the piston 14, as the latter is viewed in FIG. 1, to a source of pressure fluid or to a drain or sump. The right-hand end of the cylinder element 12 is closed by an end wall 22 and the cylinder element 12 has a port 23 therein which communicates with the interior of the cylinder element 12 immediately adjacent the right-hand wall 22, and the port 23 is connected to a conduit 24 for supplying fluid under pressure to the chamber 12b of the cylinder element on the right-hand side of the piston 14 or for connecting the chamber 12b to drain or sump. The piston 14 is reciprocable between a position where it abuts the left-hand wall of the cylinder element 12 to a position where it abuts the right-hand wall 22 of the cylinder element and in moving from its left-hand position to its right-hand position, as viewed in FIG. 1, to move the slide 10 from left to right, the piston is adapted to cover a change-speed port 26, opening into the chamber on the right-hand side of the piston 14, after the piston element has moved partway toward its right-hand position. The port 26 is connected to a conduit 27 which includes a check valve 28 for blocking flow into the cylinder element and the conduit 27 is connected to a conduit 30 to which the conduit 24 from the port 23 is also connected through a one-direction flow restrictor 31. The flow restrictor 31 restricts the flow of fluid from the port 23 and this will establish a back pressure on the piston 14 and will slow the movement of the piston when port 26 is covered. The piston 14 will operate at one speed while fluid is draining from both the port 26 and the port 23 but when the port 26 is covered, the restricted flow of fluid from chamber 12b through the flow restrictor 31 will slow the piston and produce a second speed of operation.

The conduit 30 and the conduit 21 are connected to a valve 35 comprising a valve member 35a which is reciprocated between two positions; in one position, the position shown in FIG. 1, the discharge of a pump 36 is connected to the conduit 21 to effect movement of the piston 14 to the right, as viewed in FIG. 1, and the conduit 30 is connected to the sump; while, if the valve member 35a is shifted to its other position, the connections of the pump and sump to the conduits 30, 21 are interchanged and the piston 14 will move to the left.

Figure 5:
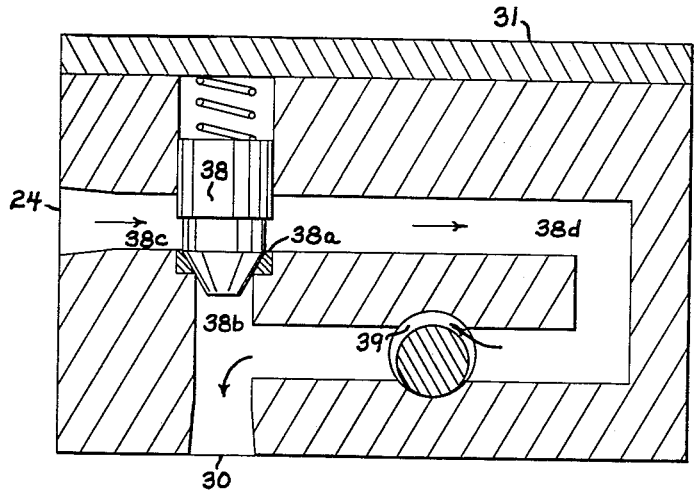
FIG. 5 is a cutaway view of a valve which may be used with the present invention.

The flow restrictor 31 is preferably of the type shown in FIG. 5 and comprises a check valve 38 adapted to move from its seat 38a to permit fluid to flow from a passage 38b to a cross passage 38c to which the conduit 24 is connected. A passage 38d interconnects the passage 38b with the passage 38c to form a bypass around the check valve 38 and an eccentric member 39 is disposed in the passage 38d to control the amount of fluid flow. The check valve closes to fluid flowing from conduit 24 but a restricted flow is maintained past the eccentric member 39.

In accordance with the present invention, the piston 14 is constructed so that it may be rotated to vary the axial position thereof at which the port 26 is covered and uncovered. To this end, the piston rod 15 is supported for rotation in the end wall 16 and in the apron 17 and may be provided with a knob 40 which is secured to the outer end of the piston rod 15 and is rotatable therewith to provide an indicator for indicating the position of the piston 14. The operator may then control the position of the piston at which the port 26 is covered or uncovered by rotating the knob 40. The piston is limited against axial movement by a shoulder on one side of the apron 17 and the knob 40 on the other side.

In accordance with the present invention, the piston 14 has a cylindrical portion 42 which is adapted to closely fit the inside of the cylinder, and in the illustrated embodiment is the portion of the piston 14 to which the rod 15 is connected, and a cylindrically curved land 43 extends axially from the periphery of the cylindrical portion 42 and has a cylindrically curved surface 44 which closely fits the cylinder element 12 but which engages the cylinder element for less than 360°.

In the illustrated embodiment, the land 43 has an oblique control edge 46 which is positionable by rotation of the piston 14 to move over the port 26 to cover and uncover the port on reciprocation of the piston. The control edge 46 is generated by moving angularly about and lengthwise of the piston 14 so that the angular position of the piston 14 will determine the relative position between the cylinder element 12 and the piston 14 at which the control edge 46 is opposite to the port 26.

In the preferred embodiment, the land 43 is formed by providing the cylindrical piston 14 with flats 48, 49 that lie in oblique planes that intersect the periphery of the piston adjacent the cylindrical portion 42 and intersect the face of the right-hand end of the piston as it is viewed in the drawings along lines which are parallel to each other and spaced equidistantly from a diametral plane of the piston, the planes diverging from each other proceeding from the right-hand end of the piston toward the left, as the latter is viewed in the drawings. The control edge 46 is formed by the intersection of the flat 48 with the periphery of the piston that forms the curved surface 44 of the land 43.

Figure 3:
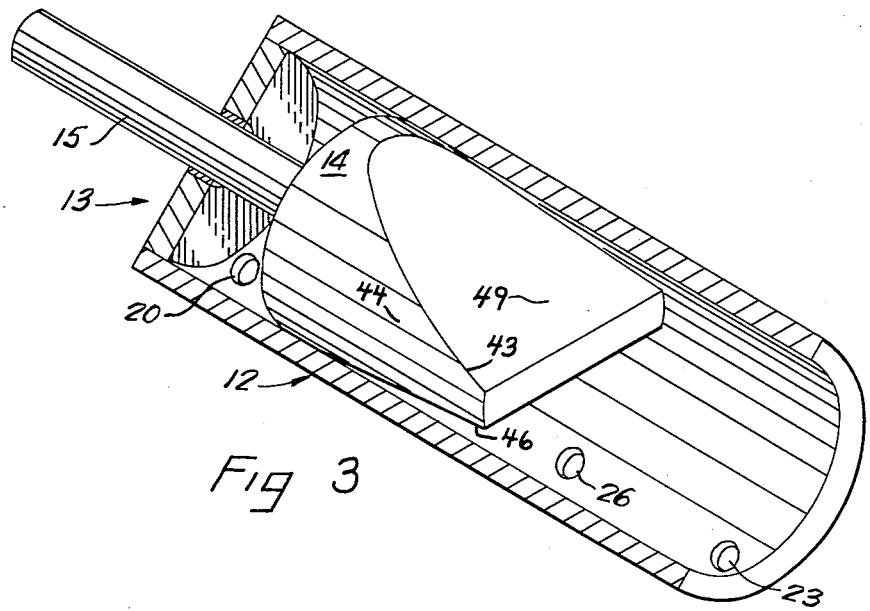
FIG. 3 is a cutaway view of the piston-cylinder actuator of FIG. 1 with the actuator being shown in schematic form.
Figure 4:
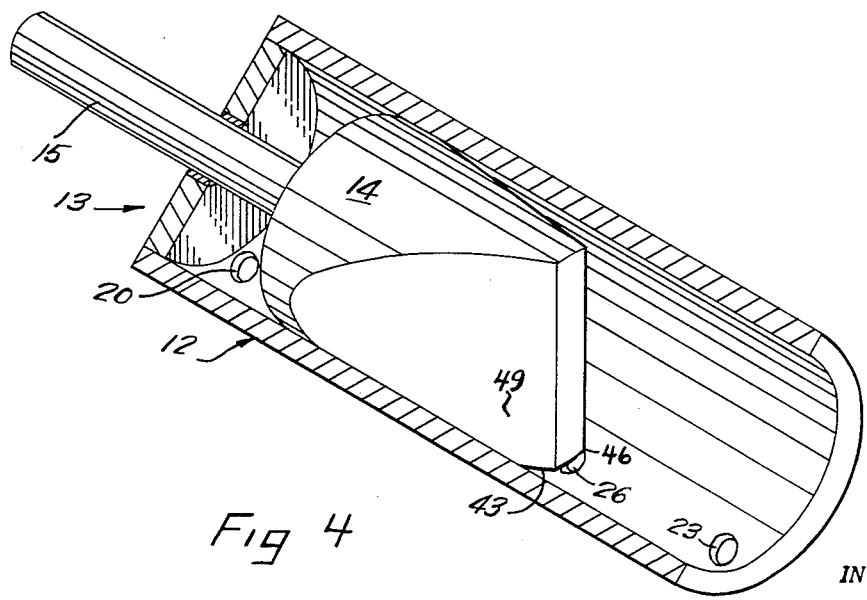
FIG. 4 is a view similar to FIG. 3 but showing the piston of the actuator in a different position.

It can be seen that, if the piston is rotated to the position shown in FIG. 4, the port 26 will be covered at the earliest possible point as the piston 14 moves toward the right to change the speed of movement of the slide 10 from a rapid rate to a slower rate and, if the angular position is changed to that shown in FIG. 3 and FIG. 1, the port will not be covered until the piston has almost completed its movement to the right and that the change of speed at intermediate positions during the travel of the piston can be made by rotating the piston to an intermediate angular position.

In the preferred embodiment, the piston is provided with the two symmetrical flats 48, 49 so that side thrust on the piston will be balanced. It will be appreciated that insofar as the valving operation is concerned, the piston would function with only the flat 48.

Figure 6:
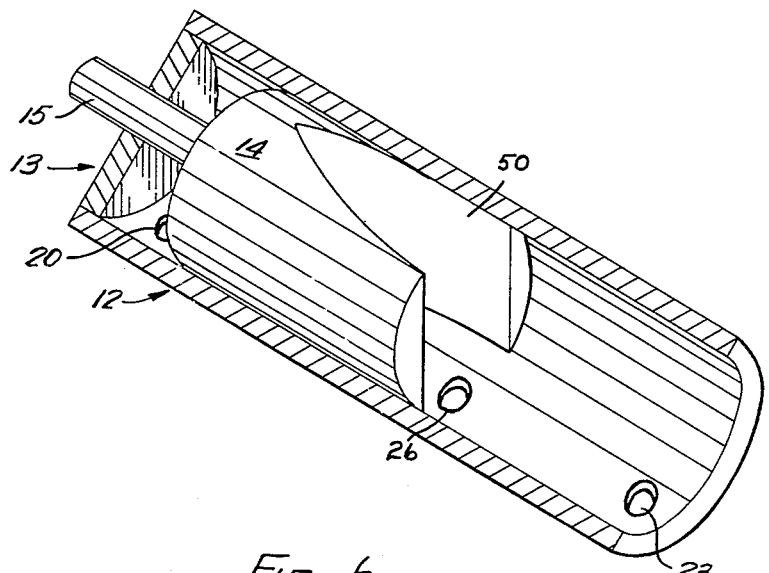
FIG. 6 is a showing of a modified form of the piston-cylinder actuator for use with the present invention.

While in the preferred embodiment, the piston is shown as having a flat which defines the control edge 46, it will be recognized by those skilled in the art that the land need not be formed by a flat on the piston but the piston may have a cutout portion 50 as shown in FIG. 6 which will provide a valving land with an oblique edge. Consequently, it may be said that the land may take various configurations as long as the land is of sufficient width to keep the port 26 covered for that portion of the travel of the piston during which the port is to be covered and the land has a control edge which extends lengthwise of the cylinder and angularly about the cylinder to provide an oblique control edge for covering and uncovering the port 26 whereby the rotation of the piston will cause the latter to cover or uncover the port at different positions of the piston relative to the cylinder element.

It will be appreciated that the piston 14 will not change speed when moving from its right-hand limit position to its left-hand limit position since the check valve 28 will prevent fluid flow into the cylinder through the port 26 when it is uncovered. The valve 31, however, is constructed to permit full flow through the conduit 24 and the port 23 for pressure fluid flowing into the chamber 12b.

From the foregoing, it can be seen that the present invention has provided a new and improved fluid pressure drive system for actuating a movable member, such as the slide of a machine tool, at different speeds, the system including a fluid pressure actuator of the piston-cylinder type and the movable element of the actuator effecting the covering or uncovering of a port to cause the change of speed. In the preferred and illustrated embodiment, the piston is supported for angular rotation about the axis of the cylinder and the piston is provided with a valving portion having a land with an oblique control edge so that the relative axial position of the piston and cylinder at which the port is covered or uncovered may be changed by relatively rotating the piston and cylinder.

While a preferred embodiment of the present invention has been described in considerable detail, it is hereby my intention to cover all modifications, constructions, and arrangements which fall within the ability of those skilled in the art and within the scope and spirit of the appended claims.

Having described my invention, what I claim is:

1. In a drive system for a slide member, an actuator comprising a cylinder element and cooperating cylindrical piston element, one of said elements being movable and connected to said slide member to reciprocate the latter upon reciprocation of the movable element of the actuator, control means for said actuator including a change-speed port intermediate the ends of said cylinder element and adapted to be covered and uncovered by the piston element as the movable element of the actuator is reciprocated to change the speed of movement of the movable element, said piston element having a valving portion for covering and uncovering said port on reciprocation of said movable element and comprising a cylindrically curved land closely fitting said cylinder element for less than 360° and having an oblique control edge which is generated by moving about and lengthwise of said piston element, and means supporting said valving portion and cylinder element for relative angular rotation about the axis of the actuator to position a particular portion of said control edge to move over said port upon relative reciprocation of the piston element and cylinder element to determine the relative axial position of said elements at which said port is covered and uncovered.

2. In a drive system as defined in claim 1 wherein said valving portion comprises a flat on said piston element lying in a plane oblique to the axis of said piston element.

3. In a drive system as defined in claim 2 wherein said piston element has two flats defining said valving portion which are symmetrically disposed with respect to a diametrical plane of the piston element and which lie in planes intersecting one end face of said piston element and diverging from said diametrical plane proceeding outwardly from said one end.

4. In a drive system for a slide member, an actuator comprising a cylinder element and cooperating piston element, one of said elements being movable and connected to said slide member to reciprocate the latter upon reciprocation of the movable element of the actuator, control means for said actuator including a change-speed port intermediate the ends of said cylinder element adapted to be covered and uncovered by the piston element for changing the speed of said movable element during the travel of said movable element in one direction between first and second positions, said port being uncovered when said movable element is in its said first position and displaced from said piston element in a direction such that movement of said movable element in said one direction effects relative movement of said port and piston element toward each other, said piston element comprising a cylindrical portion adapted to fit closely within said cylinder element and a valving portion for covering said port as said movable element is moved in said one direction comprising a cylindrically curved land extending axially from the periphery of said cylindrical portion toward said port and closely fitting said cylinder element for less than 360° and having an oblique side edge which is generated by moving about and lengthwise of said land, and means supporting said piston and cylinder element for relative angular rotation about the axis of the actuator to position a particular portion of said control edge to move over said port upon relative reciprocation of the piston element and cylinder element.

5. In a drive system as defined in claim 4 wherein said valving portion comprises a flat on said piston element lying in a plane oblique to the axis of said piston element.

6. In a drive system as defined in claim 5 wherein said piston element has two flats defining said valving portion which are symmetrically disposed with respect to a diametrical plane of the piston element and which lie in planes intersecting one end face of said piston element and diverging from said diametrical plane proceeding outwardly from said one end.

7. In a drive system as defined in claim 4 wherein said control means includes first conduit means for connecting the exhaust side of said cylinder element to drain for substantially the entire movement of said movable element from said first position to said second position, second conduit means connecting said port to drain, said first conduit means including flow restricting means to limit the speed of said movable element by restricting the exhausting of fluid from said cylinder element upon the covering of said port by said piston element.

8. In a drive system as defined in claim 7 wherein said valving portion comprises a flat on said piston element lying in a plane oblique to the axis of said piston element.

9. In a drive system as defined in claim 8 wherein said piston element has two flats defining said valving portion which are symmetrically disposed with respect to a diametrical plane of the piston element and which lie in planes intersecting one end face of said piston element and diverging from said diametrical plane proceeding outwardly from said one end.

10. In a drive system for a slide member, a fluid pressure actuator comprising a cylinder element and a cooperating piston element received in said cylinder element for relative axial movement, one of said elements being movable and connected to said slide member to reciprocate the latter upon reciprocation of the movable element, control means for controlling the operation of said actuator including first conduit means for supplying fluid pressure to said cylinder element on one side of said piston element and second conduit means connecting the other side of said piston element to drain, said second conduit means including a first drain port in communication with said cylinder element on the said other side of the piston element for substantially the full relative movement of the piston element toward that side and a second drain port in said cylinder element inwardly of the ends of said cylinder element and adapted to be covered by said piston element when said movable element has partially completed its movement in said one direction, said first drain port being connected to drain by conduit means including flow restricting means whereby the speed of said movable element is changed by restriction of fluid flow from said cylinder element when said piston element covers said second port, and means on one of said elements adapted to be rotatably adjusted relative to the other of said elements for advancing or retarding the point in the relative axial movement of the elements at which the second port is covered by the piston element.

11. In a drive system for a slide member, a fluid pressure actuator comprising a cylinder element and a cooperating piston element received in said cylinder element for relative axial movement, one of said elements being movable and connected to said slide member to reciprocate the latter upon reciprocation of the movable element, control means for controlling the operation of said actuator including first conduit means for supplying fluid pressure to said cylinder element on one side of said piston element and second conduit means connecting the other side of said piston element to drain, said conduit means including a first drain port in communication with said cylinder element on the said other side of the piston element for substantially the full relative movement of the piston element toward that side and a second drain port in said cylinder element inwardly of the ends of said cylinder element and adapted to be covered by said piston element when said movable element has partially completed its movement in said one direction, said first drain port being connected to drain by conduit means including flow restricting means whereby the speed of said movable element is changed by restriction of fluid flow from said cylinder element when said piston element covers said second port, said piston element having a land portion adapted to ride over said second port, said land portion closely fitting the interior of said cylinder element for less than 360° and having an oblique edge generated by moving about and lengthwise of the piston element and positionable by relative angular rotation of said land portion and said cylinder element to move over said second port, and means supporting said land portion and cylinder element for relative angular rotation about the axis of said piston element to position a selected part of said control edge to move over said second drain port to cover and uncover the latter port upon reciprocation of the movable element.

References Cited in the file of this patent

UNITED STATES PATENTS

| | | |
|---|---|---|
| 1,905,065 | Scholl | Apr. 25, 1933 |
| 2,986,124 | Alleman | May 30, 1961 |
| 3,002,497 | Gulick et al. | Oct. 3, 1961 |

FOREIGN PATENTS

| | | |
|---|---|---|
| 1,056,143 | France | Oct. 21, 1953 |